A. J. TANNER.
TICKET SYSTEM AND MEANS THEREFOR.
APPLICATION FILED SEPT. 17, 1921.
1,413,634.
Patented Apr. 25, 1922.
3 SHEETS—SHEET 1.
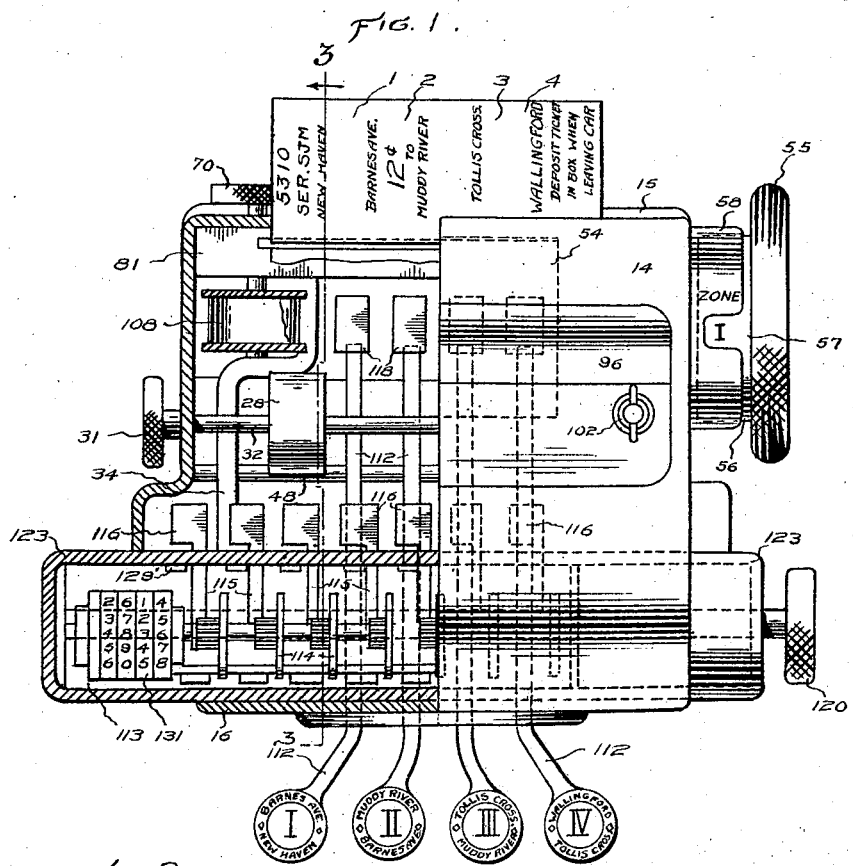
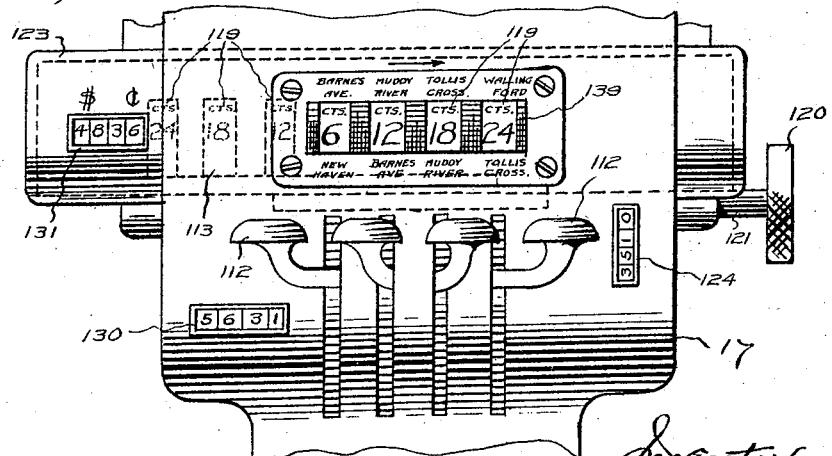

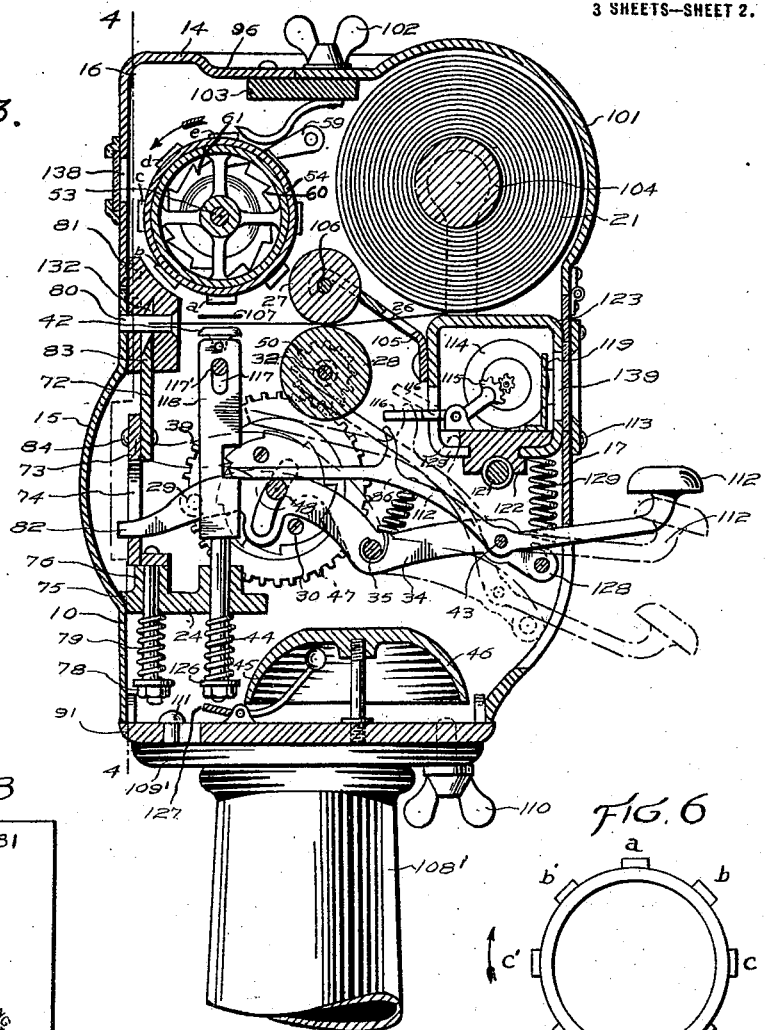

A. J. TANNER.
TICKET SYSTEM AND MEANS THEREFOR.
APPLICATION FILED SEPT. 17, 1921.

1,413,634. Patented Apr. 25, 1922.
3 SHEETS—SHEET 3.

INVENTOR
Arnold J. Tanner

UNITED STATES PATENT OFFICE.

ARNOLD J. TANNER, OF NORTH HAVEN, CONNECTICUT, ASSIGNOR TO JOHNSON FARE BOX COMPANY, OF CHICAGO, ILLINOIS, A CORPORATION OF NEW YORK.

TICKET SYSTEM AND MEANS THEREFOR.

1,413,634.     Specification of Letters Patent.     Patented Apr. 25, 1922.

Original application filed April 15, 1919, Serial No. 317,663. Divided and this application filed September 17, 1921. Serial No. 501,427.

*To all whom it may concern:*

Be it known that ARNOLD JAMES TANNER, a citizen of the United States, and resident of North Haven, in the county of New Haven and State of Connecticut, have invented certain new and useful Improvements in Ticket Systems and Means Therefor, of which the following is a specification.

The present invention relates to ticket systems and consists of improved means for producing tickets having individual differentiating characteristics and is especially useful for railway and like passenger service wherein zone or stage fares of various denominations are assessed and pre-paid according to the distance or number of zones proposed to be travelled by the passenger.

The machine proposed according to this invention has distinctive characteristics differentiating it from ticket machines heretofore proposed in that it can be successfully employed on a vehicle, while in transit, by setting the machine relatively to the particular zone in which the vehicle is travelling, and then by operation of a selected member or key of the machine, uniform tickets bearing determined indications as to the point of entry and the named destination are issued.

In practice with passenger service systems, as applied to railways, omnibuses, and the like, fares are more desirably collected by prepayment when the passenger is entering the vehicle and the operator whose duty it is to attend to the collection and checking of fares, is permanently stationed at a fixed collection point, usually on the platform of the vehicle.

Passengers boarding and leaving the vehicle at different fare points create variable conditions respecting the fare to be paid, consequently with a fairly complicated system, having a considerable number of fare points, amongst other faults, the operator is liable to make errors, particularly as regards the amount of the fare. The primary object of this invention is to remove the tendency to err by eliminating the human element in the assessment of the fares and for this purpose the improved machine is provided with automatic means which are set mechanically and successively at the time when the vehicle reaches different fare points and whereby the operation of the machine to issue a ticket for the correct fare value, becomes purely mechanical, that is, the operation thereof is simple for herein operation of a selected operating member will issue tickets showing the respective fare which varies according to the periodical setting of the machine for each fare stage or zone.

At congested points, speed is particularly essential, therefore elimination of calculation on the part of the operator is an important consideration. To permit speeded operation, with natural attendant hard usage, the improved machine is made simple and durable of construction, rapid in operation, and even though the operator employs excessive force, when working under pressure, the machine will remain in perfect working order. The improved means are efficient in operation and flexible in application so as to meet different conditions. The bulk of the machine is also a factor to be considered because available space on a passenger vehicle is necessarily restricted. The improved machine is accordingly especially designed to be compact in form, of as few parts as possible, which latter feature offers the further advantage that it renders the machine easy to assemble and readily accessible.

The tickets issued from the improved machine provide ready and positive means for determining and indicating the amount of the fare paid or to be paid from any fare point or between any two points, and by means of the tickets issued, checked with recording means of the machine, or other means, a complete and precise record of the money or other value receipts may be easily ascertained.

The salient features of the invention, amongst others hereinafter particularly described are—firstly, the ticket having a plurality of defined divisions or blank spaces representing zones, or distances between fare points provided thereon in preparation to receive a designating character or sign in a selected position or order so as to indicate a determined fare value between selected points; secondly, a movable member of the machine having a plurality of printing characters or devices arranged thereon in a manner whereby through successive setting of said member, any one, two or more of said printing characters are successively brought into a predetermined printing position relatively to said divisions or blank spaces on the ticket; thirdly, the machine is provided with operating means comprising a main lever or member carrying or having associated therewith one or more secondary or subsidiary levers or members capable of independent initial operation relatively to said main member whereby the initial operation of said operating means will first effect printing of the ticket and give an audible signal of that operation and subsequently the main and secondary member or members will move as one united member and in proper sequence effect feeding and severing of the ticket; and fourthly, the machine is provided with recording means when employing a plurality of secondary levers, each lever operating in unchangeable relation with a device or devices effecting printing in one particular space or division on the ticket; said recording means comprising a plurality of separately actuatable counters, representing different value denominations, and which counters are capable of being set in determined and successive operative relation with said secondary levers whereby different determined valuations may be recorded by each of said secondary levers.

In carrying out the principles of the invention above referred to, various improved details of construction and arrangement of parts are introduced. Such details also form part of the present invention and the same together with the main features of the invention will be fully described hereinafter with reference to the accompanying drawings illustrating different embodiments of the invention and in which drawings—

Figure 1 is a plan view partly in section illustrating a form of machine suitable for a pre-payment fare collecting system;

Figure 2 is a rear elevation showing part of the machine;

Figure 3 is a vertical section taken on line 3—3 of Figure 1;

Figures 6 and 7 illustrate diagrammatically a method of arranging the type on a printing drum used with the improved machine, and Figure 8 shows a specimen ticket whereon all printed matter is imprinted by the machine using a blank ticket strip.

Figure 4:
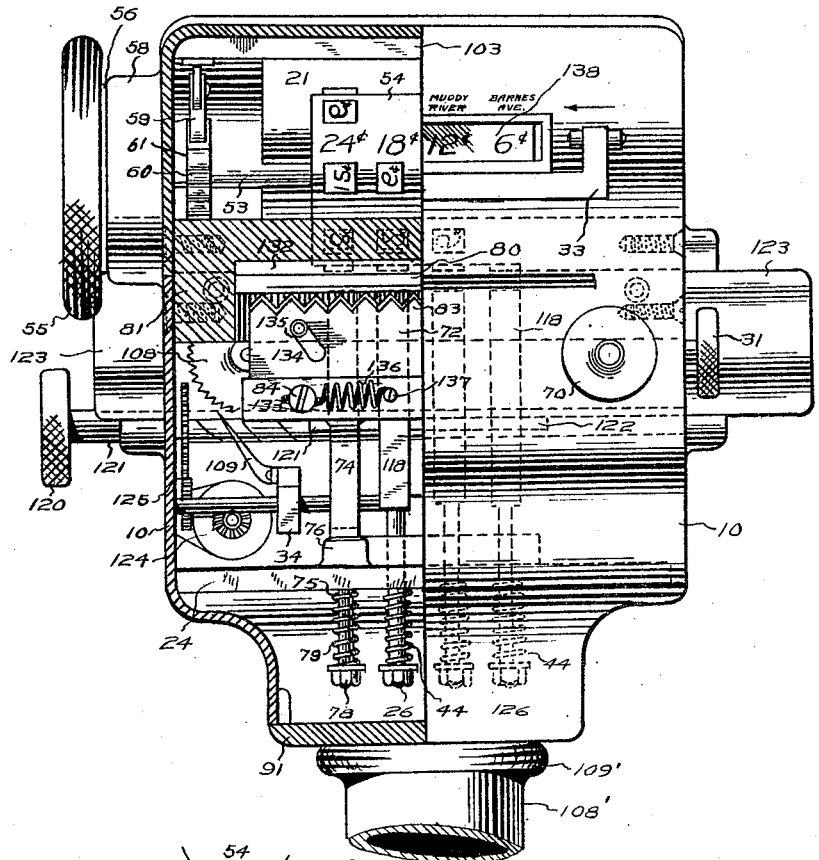
Figure 4 is a front elevation partly in section taken on line 4—4 of Figure 3.

Referring to the accompanying drawings, wherein 10, represents a casing enclosing the working parts of the machine with the exception of the external keys 112. The casing is composed of top section 14, front plate 15, side plates 16, and back plate 17, which latter plate is retained in place by thumb nuts 102. The back plate 17 or hinged part 101 is removable for the purpose of inserting, when required, a fresh roll 21, containing strip tickets. The ticket strip from said roll, passes through guide slot 26 in plate 105, and by this guiding means straight travel of the ticket strip between feed rollers 27 and 28 is ensured.

The printing drum 54 rotates with the shaft 53 which is turned intermittently by means of knob 55, to set the selected printing type in alignment with the printing platens hereinafter referred to. A hub or cylindrical portion 56 of the knob 55 bears indicating characters thereon representing zones or fare points and these characters are arranged in proper order relatively to the arrangement of the printing type on the drum, so that, for example, the numeral 1, exposed through the opening 57 in the cover 58 indicates that the vehicle is traveling in the first zone. With this setting of the indicating device, operation of the machine will issue a ticket with printing matter thereon as illustrated; for example, in Figure 1 when prepared tickets are employed, or as shown in Figure 8, when blank tickets are used.

An example of one method of carrying out the principle involved in the arrangement of the printing characters or type is illustrated in Figures 6 and 7 and it is to be noted the illustrative example is designed for a route having five fare points or four zones, for which a charge of six cents is made for each zone. It will be assumed the vehicle is travelling in the first zone between points named, "New Haven-Barnes Ave.", and the machine shown in Figure 1 is set accordingly. Agreeing with the reading of the indicator, group, column, or row *a* of type drum 54 is in position for service and consequently in issuing a ticket one of the divisions or blank spaces of the ticket, representing zones, has a fare value printed therein. When the vehicle arrives at the second zone, "Barnes Ave.-Muddy River", the operator advances the drum one point and this operation is guided by engagement of the detent 59 in the next notch 60 of the detent wheel 61. Then type row *b* is in position for service and so on, each row of printing type is brought into position for service as the vehicle progresses in its journey from point to point, the fare values being retrogressively reduced both in number and value until for the last zone one character alone, namely, the six cent stamp, is in a position for printing.

The ticket severing device consists of the knife blade 72 and carrier plate 73, which latter plate has legs 74 terminating as rods 75 having a sliding bearing in bosses 76 in the plate 24. Nuts 78 are provided for regulating the tension of the spring 79 which returns the knife blade carrier to the normal or down position, whereby the opening 80 through the cross member 81 is left clear for the passage of the ticket. The extremities 82 of the levers 34 engage the carrier 73 after the ticket feeding action is completed. The cutting edge 83 of the knife is preferably serrated and to give a shearing cut the knife blade is given an oscillatory motion by the pins or rivets 84.

The ticket printing, feeding, and severing mechanism, hereinbefore referred to is more fully described in my application Serial Number 317,663 filed August 15, 1919, of which the present application is a division. In my first application mechanism and other parts of the invention described are adapted for the post-payment of the fare and in which case it is required that the ticket should serve as means for indicating the fare the passenger has to pay when he is about to leave the car. In the said previous arrangement, one, two, or more of the printing type are brought into service by the initial movement in the operation of issuing the ticket. The fare amount for all untraversed zones will be indicated on each ticket and assessed from the zone in which the ticket is delivered in a manner so as to be readable by the holder of the ticket, as well as by the operator.

According to the present carrying out of the invention, the said mechanism is applied with other parts of the invention to a machine useful for a prepayment fare system, in which case the passenger pays the fare when entering the car. The principles involved in the other embodiment of the invention are mostly found in the present embodiment and a number of parts, or details are substantially alike, but the present or prepayment type of machine differs chiefly in that the printing type are separately and individually brought into service and a registration indicating separate determined values is recorded by means of a series of counters. For instance, with the ticket illustrated in Figure 8, one counter will always indicate the multiple of 6¢ value tickets issued, another 12¢ tickets, the third 18¢ tickets, and the other 24¢ tickets. These counters are fixedly mounted on a common sliding carrier which may be moved on its base in selective order relatively to a plurality of printing keys whereby any one key representing a determined value, for the time being, may be operated by selection to print a ticket with the proper destination indication and value receipt thereon, and the operation of any one of said keys will effect issue of a ticket in the manner aforesaid, and effect a recording indication of the value of the ticket issued.

In this form of the machine, a suitable casing is provided and the strip ticket roll 21 is carried under the hinged cover 101, which is held in closed position by a fastening device 102 mounted on the cross member 103. Spring clips 104 (shown on dotted lines), provide a bearing for the roll and the ticket strip is guided through an opening 26 in spring plate 105 which plate bears and imparts tension on continuous shaft 106 having mounted thereon idler feed rollers 27. The detent wheel 61 has ratchet teeth engaged by the pawl 59 in a manner so that the printing drum 54 can be rotated in one direction only, as indicated by the arrow, and this limitation will prevent the operator from turning the drum backwards for any purpose.

Any approved printing means such as a ribbon and suitable feeding mechanism may be employed with this or any embodiment of the invention. With this embodiment, the ribbon 107 travels at right angles to the ticket strip, from one ribbon drum 108 to another. Rotation of one of the ribbon drums, or both, if a known form of automatic feed reversing device is employed, may be effected by means of dog 109 carried on one of the levers 34. Each operation of the levers 34 to feed a ticket, causes operation of the ribbon feeding device.

The machine is detachably mounted on a suitable base, for example, a pillar 108' having top plate 109' to which the bottom plate 91 of the machine is secured by nut 110 and stud 111.

The levers 34 are, in construction and general arrangement relatively to the ticket printing, feeding, and severing mechanism, substantially the same as employed in the post-payment type of machine hereinbefore referred to, but instead of a single operating handle 11 a plurality of key levers 112 are employed for the pre-payment type machine. One key is employed for each fare value and as previously mentioned the number of keys is equal to the number of zones. The relative position of each key with its particular zone is unchangeable but the value of each key is progressively changed by the following means. A sliding carrier 113 has mounted thereon the recording counter composed of a series of counting units 114, each unit having its individual operating lever arm 115. Each lever 115 terminates in a flattened end 116 and by moving said carrier these ends are selectively and successively brought into the path of the projections 116' of which there is one on each key lever 112. A series of separately actuatable platens 118 is employed and each platen co-operates with its individual key lever 112 by engagement of the free end of the latter with the notch 39. Operation of any selected key 112 will effect printing through raising of the platen associated therewith substantially the distance allowed by slot 117, through which a common supporting rod 117' passes. The value registered by the counting mechanism depends on which arm 115 is lying in the path of the projection 116' of the operated key, and the proper or agreeing value printed on the ticket depends on the correct setting of the printing drum 54.

Correct setting of the value registration and destination indication and value printed on the ticket relatively to each other and with respect to the location of the vehicle may readily be effected and ascertained by means of the indicators 138 and 139. By means of indicator 138 a reading of the relative position of the printing drum 54 is obtained. In Figure 6 the type or characters of group or column $a$ are shown in position for service, and the machine is assumed to be set for operation while the vehicle is in the first zone. The space between columns $c$ and $d$ is before the opening in the indicator 138, and in this and like spaces in proper relative order, the same values contained in the type columns are printed in conspicuous readable type. This indicator 138 shows the fare values relatively to the destinations appearing on or exposed by the pivoted mask 33. The other indicator 139 shows the fare value which will be printed and recorded for any selected destination by operation of the respective key. Indicator 139 consists of a strip 119 bearing thereon printed matter representing fare values which are progressively and successively brought before the glazed opening of the indicator, with the movement of the sliding carrier 113.

In the drawing the ticket issued, is intended for a four zone route but it will be understood, the operation and general arrangement is the same for a different number of zones, only of course there would be a key and associated recording and indicating device for each and every zone. According to this setting of the machine, shown in Figure 1, the vehicle is still assumed to be in the first zone and key 11 has been operated to deliver a ticket to a passenger whose destination is within the second zone and the fare paid is 12 cents. Passengers having zones 3 or 4 as their desinations would have a ticket issued to them valued respectively 18 cents, and 24 cents. Assuming now that the vehicle has reached the second zone, the operator turns knob 55 one point and numeral 11 will appear before the opening 57 and on the indicator 138 the indicated fare value for the remaining untraversed zones 2, 3, and 4 would be respectively 6 cents, 12 cents, and 18 cents. At the end of the journey, continued rotation of the drum will bring the reading in a reverse order, namely values 6 cents, 12 cents, 18 cents, and 24 cents respectively for zones 4, 3, 2, and 1 and so on, the movement is progressive and at the end of one trip the printing drum is set in proper position for the first zone of the next trip. The arrangement of the printed matter added to the ticket by the machine will indicate the direction of travel of the vehicle.

The change in the relative position of the recording means is effected by turning knob 120 to rotate worm 121, which engages a thread on the base 122 of the sliding member 113. By this means the said member is caused to slide to bring the various value recorders progressively into co-operative relation with the various keys. The movement of the sliding member is to and fro and carries duplicate recording devices, excepting the lowest or first value 6 cents which may be used in either journey of the vehicle so duplication of the same is unnecessary unless a separate detailed count is to be kept of traffic returns between any two fare points.

The sliding carrier 113 is enclosed within a housing 123 which may be locked to prevent unauthorized access thereto. Furthermore, a record is taken of the operation of the sliding carrier, by means of the counter 124 which is connected to the worm 121 by suitable transmission means, gearing 125 for instance, in a manner that improper operation of the sliding of the sliding carriers can be detected.

Each plunger platen 118 has its individual spring 44 for returning it to its normal position and the tension of said spring may be adjusted by means of nut 126. In its return movement the end of the operated platen strikes the bell crank lever 45 so as to ring the bell 46. The end of this lever, 127, is T-shaped so as to be in line to engage any one of the platens so that ringing of the bell is effected by operation of any one of the platens.

The machine is so designed that to issue a ticket one of the keys effecting printing must be operated, the only access to operating levers 34 being through the keys. When one of the keys is depressed, this operation having caused the printing and the platen being restored to its normal position, the operated key strikes the tie rod 128 between the levers 34 and then continued depression of the key operates the levers 34 against the return springs 129, effecting the feeding of the ticket and subsequently, when feeding is completed, the severing of the ticket.

The initial movement of the operated key lever is about the pivot 43 and when the tie bar 128 is engaged the operating levers 34 and all the keys 112 move with the said levers 34 as one unit, about the pivot constituted by shaft 35. Sufficient movement is allowed the operated key lever 112 so as to give the registering counter arm 115, for the time being engaged by the projection 116 on said key, the required movement to record a count. The housing 123, it will be seen, has slots 129' cut therein to receive the projections 116' and thereby the movement of the operated keys is not arrested until the said key strikes the shaft 32.

It may be required that the machine should consecutively number the tickets or such matter may previously have been printed on the ticket with other matter, but to retain a record of the number of tickets issued, and to facilitate counting and checking of the tickets and receipts with the number of passengers carried, a counter 130 may be provided and be operated from the levers 34. In case it is required, a total adding value device 131 is included and the same, as well as any detail adding devices employed, may be of any well known form such as employed, for example, with cash registers in common use and wherein motion is imparted to the index dials of the register through a shaft rotated according to the value of the key operated.

Referring to Figure 2, herein the ticket severing device is more clearly shown. The movable knife blade 72, having a saw tooth cutting edge 83, severs the ticket, but not entirely, a minute fractional part remaining uncut so that the ticket will not fall or be blown away before the passenger takes it. The unsevered portion will readily tear before resistance of the ticket feed roller is overcome to permit pulling out of the strip.

The groove 132 formed in the cross piece 81 ensures a better cutting edge, and because of the length of the ticket to be cut, the cutting is effected by a shearing cut obtained by oscillatory motion of the knife blade 72 on the blade carrier (73) which latter member has a vertical movement only. The blade is allowed oscillatory movement through the connection provided by pin 84 and slot 133. The angular or cam slot 134, engaging the roller on pin 135, effects lateral movement of the knife blade and spring 136 secured at one end to the pin 84 on the knife blade and at the other end to pin 137 on the carrier, gives a quicker action to the oscillatory motion of the knife blade.

Figure 5:
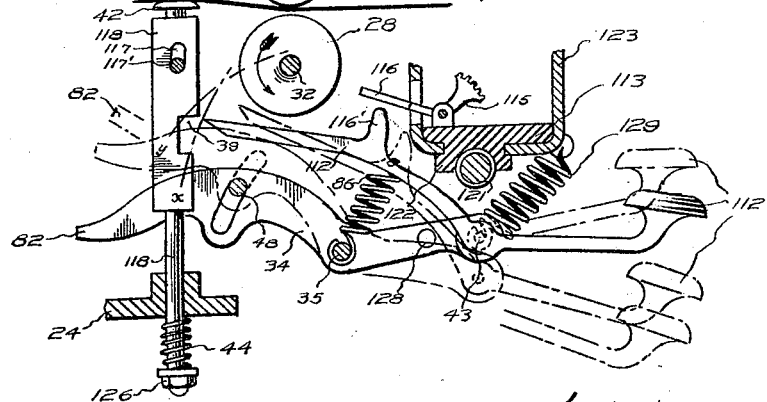
Figure 5 is a detail fragmentary view illustrating a modified form of mechanism for operating the printing device and also showing its relation to the recording means.

Referring to Figure 5, illustrating in a slightly modified form the working parts of the mechanism which effects operation of the printing, feeding, severing, and registering devices of the machine. The operating lever 34 of which there are preferably two, one on each side of the machine to obtain a well balanced construction, is shown by full lines as being in its normal position. The lever type key 112 is shown in full lines as being in the depressed position it is in when printing is effected. This lever 112 is about to release the platen 118 which is in its raised or printing position. This key lever is moved to said full line position by turning on the pivot 43, in a path represented by line $x$. Further movement downward on the pivot 43 will first bring the inner end of the lever against feed roller 28, then continued pressure on the key creates a compoundage of the movement and leverage of the several levers. The pair of levers 34 being united together by the rod 128, they are moved as one unit about the pivot 35 in a path represented by line $v$. The end of the lever 112 bearing on the roller 28 is for the time being the fulcrum from which the mechanism operates. Pressure brought to bear on said key when feeding is effected between the full line position and first broken line position of the lever 34, will be an advantage in that the contact of said key with the roller will act as a brake or check against spinning of the feed roller, particularly as the severing of the ticket takes place, when the end 82 of the lever 34 is in its highest position and the pawl 29 is out of engagement with the ratchet wheel 30.

The engaging end of the key 112, during the initial movement of the latter, travels in the arc of a circle having the pivot 43 as a center as before stated. During this movement the printing platen is moved upward sharply to effect a perfect print. In the returning movement, when pressure on the key is relaxed, spring 86 having a quicker action than spring 129, the operated key will return to its normal position, lying on the shaft 48 with the companion keys, which during the foregoing operation remained in this position. When in their normal position the keys all travel substatnially in the arc of a circle having the pivotal point 35 as a center.

The keys are returned to their normal position by their individual springs 86 and the ends of the keys readily enter into re-engagement with their respective notches in the platens 118, but if required, a pawl or other device to break the ends of the lever in the direction of the return movement of the key may be employed.

Figure 8 illustrates a specimen ticket whereon all the printed matter is imprinted on a blank ticket strip by the machine and in which case the printing characters or marks include the fare value denomination and indication of the destination in respect of which the fare was paid.

The operation of the improved means is simple as will be gathered, the operator need only set the machine correctly in the first instance and thereafter by a purely mechanical action on his part, he may readily and quickly change the registering and printing devices for each zone. With the means provided the change may be made correctly with sense of feeling only and furthermore the passenger may, by means of the indicator, readily determine for himself, just what fare he must pay to any selected fare point.

It may be mentioned, the drawings herewith illustrate the machine approximately full size and this machine is adaptable for use on any route having, as an example, four zones and an equal numbr of fare values simply by changing the type drum.

Naturally in instances where there is a greater number of zones a machine having the desired number of keys and accompanying parts must be employed. In practice it may be desirable to manufacture say three standard sized machines, for example, the smallest size, for use with four zones, the next size for use with six zones, and the largest size for eight zones. The smallest sized machine will meet most requirements and the largest size would be for exceptional cases only.

The movable printing drum and the arrangement of the printing type or characters thereon in a manner as described herein and applied to a pre-payment fare machine is an important feature of this invention, and the utility thereof in computing fare values, among other things, increases with increasing number of zones. For instance, with a six zone route there may be as many as twenty fare changes in each journey, forty changes in the entire trip. Complexity increases progressively with the increase in the number of zones on account of the retrogressive reduction of the fares as the vehicle advances, consequently, when fares are calculated mentally, the operator is apt to make mistakes and the passenger is often in doubt and requires an explanation, causing a delay.

With the improved system the passenger receives a ticket when he boards the vehicle and whether or not he then makes a payment is according to the system employed. In any event, the ticket is in the possession of the passenger and the ticket is an indicator which will inform the passenger exactly what fare he must pay, the amount of which is always assessed from the point he boarded the vehicle. And, if the passenger desires to contribute towards perfecting the service, he will ascertain, by inspecting the ticket, the amount of the fare payable at his destination, and he will then have the excess fare, should there be one, ready to hand the operator stationed at the pay-point.

Furthermore, the tickets provide means whereby the company's officials or inspectors may readily check the returns and detect irregularities, which supervision will cause the operator to be careful and not let discrepencies occur.

Modifications of the details of construction in the means hereinbefore described and illustrated in the drawings may readily be conceived and carried out, and it is to be understood all modifications coming fairly within the terms of the appended claims shall be covered thereby.

I claim:

1. A pre-payment multiple stage or zone fare computing and ticket issuing machine having means adapted to be set with relation to each stage or zone to compute and indicate variable determined fares and said means being selectively operatable to issue from a ticket strip separate tickets bearing thereon matter indicating a fare payment in respect of a given destination or destinations.

2. A pre-payment multiple stage or zone fare computing and ticket issuing machine having means adapted to be set with relation to each stage or zone to compute and indicate variable determined fares and said means being selectively operatable to issue from a ticket strip separate tickets bearing thereon matter indicating a fare payment in respect of a given destination or destinations and a series of counters operatively associated with said means whereby a segregated count is kept of the number of operations of said means for the purpose of ascertaining the total sum of the fare payments in respect of which tickets were issued by said means.

3. In a stage fare ticket machine, a progressively movable printing member having thereon a plurality of characters arranged by groups in a determined order and associated with means whereby a print is obtained by selection from any one character of any group to indicate a determined value paid in respect of a given destination or farepoint.

4. In a ticket system for a passenger service system having multiple stage fare points, means comprising an intermittently non-returnable and progressively operating member having printing devices arranged in a determined order with respect to said stage fare points and adapted to be used on a ticket having defined spaces corresponding to said stage fare points; means for selectively changing and indicating the position of said operating member; means comprising a pluraliy of separately operative keys or members for producing an imprint from any selected printing device; and means for counting the number of operations of any one of said keys or members with relation to any printing device.

5. In a ticket system for a multiple stage fare collection system, means comprising an intermittently, non-returnable and progressively operating member having printing devices arranged thereon in a determined manner to represent fare points and their respective fare values and adapted to be used on a ticket having thereon indications corresponding to the fare points; means for selectively turning said operating member to position said printing devices in a determined relation with said indications; means comprising keys or separately operative members for producing an individual printing operation from a selected printing device; and a series of counters movable as one unit whereby said counters are selectively placed in operative relation with said keys so that operation of any key is counted and recorded with respect to its transitory relation with any given value represented by the printing device operated.

6. In a multiple fare ticket system means comprising a machine having a series of separately actuable platens; an individual operating key or lever permanently associated with each platen; a printing member having thereon type representing a determined graded order of fare values; means for successively changing the position of said printing member whereby the position of said type is varied relatively to said platens; a member carrying a series of graded counters associated with said keys or levers; and means for moving said members whereby said counters are selectively changed relatively to said keys or levers.

7. In a multiple fare ticket system, means comprising a machine having a series of separately actuable platens; an individual operating lever permanently associated with each platen; a printing member having thereon type representing in determined graded order fare values; means to effect selective progressive setting of said printing member relatively to said platens; and an indicator for guiding selective operation of said platens.

8. In a multiple stage fare system, a machine for issuing validated tickets from a ticket strip; said machine having separate printing and issuing mechanism operated respectively by an initial movement of one of a series of actuating levers of the machine and by continued movement of the operated actuating lever when brought into co-operative relation with an actuating member of the machine; a series of platen separately actuable to print a selected fare indication on a ticket; said platens being permanently associated with said series of actuating levers; a printing member having thereon type representing different fare indications arranged in a determined graded order; means for effecting selective progressive setting of said printing member relatively to said platens; position indicating means associated with said printing member; a movable carrier provided with a series of counters representing determined graded valuation; said carrier being capable of selective movement to position said counters relatively to said actuating levers; and an indicator whereby the respective valuation of each actuating lever at the time of operation, is indicated.

9. A multiple stage pre-payment fare ticket machine having ticket printing mechanism capable of selective setting; a plurality of separately actuatable operating means for effecting a single or repeated action of said mechanism to produce one or more tickets bearing thereon printed matter indicating variable fares between changing fare points; and said printing mechanism comprising a printing member having thereon characters representing fare indications arranged in a determined graded order relatively to said fare points.

10. A multiple stage pre-payment fare ticket machine having ticket printing mechanism capable of selective setting; a plurality of separately actuatable operating means for effecting a single or repeated action of said mechanism to produce one or more tickets bearing thereon printed matter indicating variable fares between changing fare points; said printing mechanism comprising a printing member having thereon characters representing fare indications arranged in a determined graded order relatively to said fare points; and a plurality of separately actuatable printing platens for effecting a printing operation from any selected printing character set into operative position with its respective platen.

11. A multiple stage pre-payment fare ticket machine having ticket printing mechanism capable of selective setting; a plurality of separately actuatable operating means for effecting a single or repeated action of said mechanism to produce one or more tickets bearing thereon printed matter indicating variable fares between changing fare points; said printing mechanism comprising a printing member having thereon characters representing fare indications arranged in a determined graded order relatively to said fare points; a plurality of separately actuatable printing platens for effecting printing operation from any selected printing character set into operative position with its respective platen; and a plurality of operating keys remaining permanently in the same operative relation with said platens.

12. A multiple stage pre-payment fare ticket machine having ticket printing mechanism capable of selective setting; a plurality of separately actuatable operating means for effecting a single or repeated action of said mechanism to produce one or more tickets bearing thereon printed matter indicating variable fares between changing fare points; said printing mechanism comprising a printing member having thereon characters representing fare indications arranged in a determined graded order relatively to said fare points; a plurality of separately actuatable printing platens for effecting a printing operation from any selected printing character set into operative position with its respective platen; a plurality of operating keys remaining permanently in the same operative relation with said platens; and a plurality of counters representing graded counts or values for counting every printing operation according to its grade; said counters being mounted on a common base which is selectively movable to locate said counters in a determined position with respect to said operating keys.

13. A multiple stage pre-payment fare ticket machine having ticket printing mechanism capable of selective setting; a plurality of separately actuatable operating means for effecting a single or repeated action of said mechanism to produce one or more tickets bearing thereon printed matter indicating variable fares between changing fare points; said printing mechanism comprising a printing member having thereon characters representing fare indications arranged in a determined graded order relatively to said fare points; a plurality of separately actuatable printing platens for effecting a printing operation from any selected printing character set into operative position with its respective platen; a plurality of operating keys remaining permanently in the same operative relation with said platens; a plurality of counters representing graded counts or values for counting every printing operation according to its grade; said counters being mounted on a common base which is selectively movable to locate said counters in a determined position with respect to said operating keys; and means for setting and indicating the graded relation of said counters with respect to said operating keys.

14. A multiple stage pre-payment fare ticket machine having ticket printing mechanism capable of selective setting; a plurality of separately actuatable operating means for effecting a single or repeated action of said mechanism to produce one or more tickets bearing thereon printed matter indicating variable fares between changing fare points; said printing mechanism comprising a printing member having thereon characters representing fare indications arranged in a determined graded order relatively to said fare points; a plurality of separately actuatable printing platens for effecting a printing operation from any selected printing character set into operative position with its respective platen; a plurality of operating keys remaining permanently in the same operative relation with said platens; and said operating keys being each operatable initially to effect selective printing and continued movement of any operated key effecting operation of means to deliver the printed ticket.

15. A multiple stage pre-payment fare ticket machine having ticket printing mechanism capable of selective setting; a plurality of separately actuatable operating means for effecting a single or repeated action of said mechanism to produce one or more tickets bearing thereon printed matter indicating variable fares between changing fare points; said printing mechanism comprising a printing member having thereon characters representing fare indications arranged in a determined graded order relatively to said fare points; and said operating means comprising an actuating member composed of two parts pivotally united and of which one part is capable of independent initial movement relatively to the other part to effect the printing operation.

16. A multiple stage pre-payment fare ticket machine having ticket printing mechanism capable of selective setting; a plurality of separately actuatable operating means for effecting a single or repeated action of said mechanism to produce one or more tickets bearing thereon printed matter indicating variable fares between changing fare points; said printing mechanism comprising a printing member having thereon characters representing fare indications arranged in a determined graded order relatively to said fare points; said operating means comprising an actuating member composed of two parts pivotally united and of which one part is capable of independent initial movement relatively to the other part to effect the printing operation; and said operating member comprising a jointed lever capable of breaking at the joint thereof; an arm on the initially movable part of the lever and a lever for operating a member of the printing mechanism engaged and operated by said arm.

17. In a stage fare ticket issuing machine, a non-reversible printing member having thereon a plurality of characters arranged by groups in graded relative order whereby each group may be aligned with means for obtaining an imprint separately from any character of each group.

Signed at New Haven, in the county of New Haven and State of Connecticut, this 16th day of September, A. D. 1921.

ARNOLD J. TANNER.